April 19, 1949. L. CARRIÈRE 2,467,464
REFRIGERATOR WITH DEFROSTING PAN
Filed Aug. 2, 1946
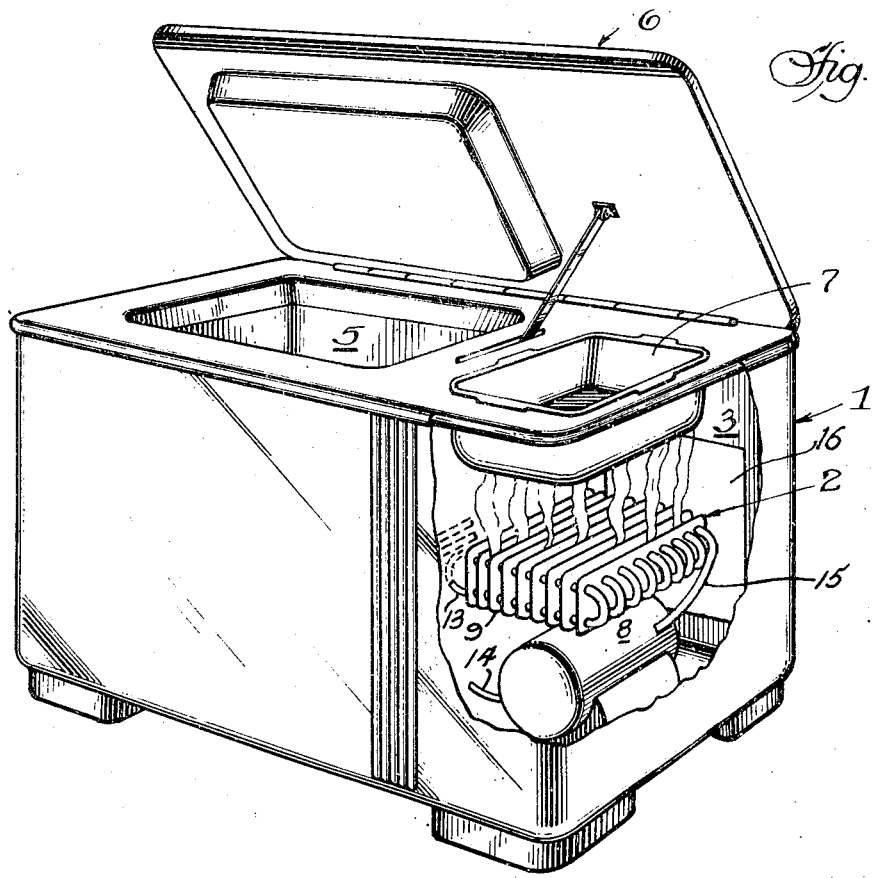
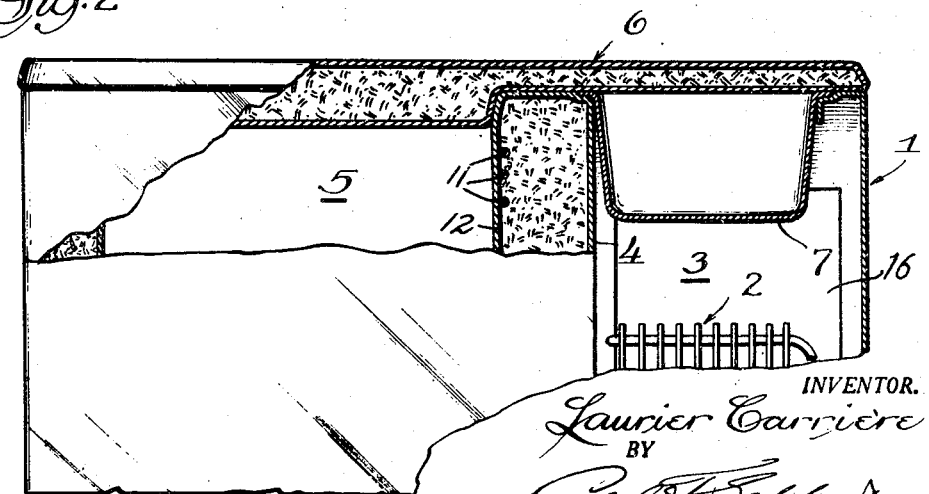
INVENTOR.
Laurier Carrière
BY Patented Apr. 19, 1949

2,467,464

UNITED STATES PATENT OFFICE 2,467,464

REFRIGERATOR WITH DEFROSTING PAN

Laurier Carrière, Rockford, Ill., assignor to The Maytag Company, Newton, Iowa, a corporation of Delaware Application August 2, 1946, Serial No. 688,133

8 Claims. (Cl. 62—89)

The present invention relates to a food freezer cabinet and especially to a novel defrosting pan or food tray therefor and its novel assembly and arrangement whereby this pan or tray is mounted in a position for receiving the heat from the compressor unit to heat the pan and defrost any food placed therein.

Among the objects of the present invention is the provision of a novel food tray or defrosting pan so constructed and arranged in the freezer cabinet as to facilitate the defrosting or thawing of food and provide a convenient place for holding the food while it is being defrosted.

In the so-called deep or home freezing units or lockers now employed and especially those for use in homes, the food is frozen and maintained at a low temperature until it is removed and made ready for use. As the food when removed from the cabinet or locker is frozen, sufficient time must be allowed for defrosting or thawing of the food. In the present novel invention, the food need not be removed from the cabinet or locker for defrosting but merely placed in the defrosting or thawing pan or food tray where it is subjected to the heat from the compressor and retained therein until it is ready to be cooked or otherwise prepared for ultimate use.

The invention further comprehends a novel frozen food cabinet or unit provided with a defrosting compartment located adjacent to but insulated from the freezing compartment and covered by a single lid, and a novel removable tray or pan disposed in the defrosting compartment immediately above the compressor so as to utilize the heat from the compressor, and when the tray or pan is removed allows access to the compressor for adjustment or repair.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of a frozen food cabinet or locker embodying the novel construction and assembly and with a portion of the cabinet broken away for showing the relationship of the compressor and the defrosting pan or food tray.

Fig. 2 is a fragmentary enlarged view in vertical cross-section taken longitudinally of the assembly.

Referring more particularly to the novel embodiment selected to illustrate the present invention, the frozen food locker or deep freezing unit comprises a cabinet 1 preferably of the home or portable type having a refrigeration system for preserving food and including a pump or compressor unit 2, the cabinet being divided to provide an end compartment 3 housing the refrigerant liquefying unit 2 and a freezer compartment or storage chamber 5 insulated from the exterior and from the compartment 3 by an insulating partition 4, the remainder of the refrigerating system being housed within the cabinet about the freezer compartment or storage chamber 5. A lid 6 covers and insulates the freezer compartment to the outside atmosphere.

Disposed directly above the compressor unit 2 is provided a removable food tray or defrosting pan 7. This tray rests flush with the top surface of the open cabinet whereby the lid 6 covers the tray as well as the food opening in the freezer compartment 5 and the tray forms a closure for the top opening in the cabinet. By mounting the tray in the position and manner disclosed, heat from the compressor unit or refrigerant liquefying unit 2 and including the compressor 8 and condenser 9 warms up the food tray and its contents and thereby permits defrosting or thawing of food placed in this tray and at the same time makes it unnecessary to use valuable space in the kitchen or other place for the food while it is being defrosted. In addition, the covered tray avoids exposing the food to the outside atmosphere and eliminates the danger of contamination.

By making the tray removable so that it may be lifted out when occasion requires, it facilitates not only cleaning thereof but also the handling of the food and allows ready and convenient access to the compressor unit for temperature adjustment. Evaporator coils 11 are shown as disposed adjacent the inner liner 12 of the freezer compartment 5 and connected at 13 to the condenser 9, while a suction conduit 14 connects the evaporator to the compressor 8 and a conduit 15 leads from the compressor to the inlet portion of the condenser.

The rear of the compartment 3 is provided with an opening 16 which permits the circulation of air from the ambient atmosphere into and out of this compartment, the air flowing over the coils of the condenser 9 and compressor 8 to cool the same and insure the proper operation of the refrigerant liquefying unit 2 and to liquefy the compressed gas in the condenser of such unit. The heat for defrosting or warming the frozen foods placed in the tray or pan 7 is convectional heat which absorbs a portion of the heat generated in the compressor and condenser of the refrigerant liquefying unit. Over this opening 16 is preferably disposed a grill or the like.

From the above description and the disclosure in the drawing, it will be readily apparent that the invention comprehends a novel food tray or defrosting or thawing pan for defrosting of foods after they have been removed from the freezer of a refrigerating unit such as a home freezer cabinet or deep freeze unit. Foods that require defrosting may be placed in this tray and the heat from the compressor assists in the defrosting action, while at the same time the tray or pan provides a most convenient place for retaining the food during the defrosting or thawing period and makes it unnecessary to use some other valuable space in the kitchen for the long period required.

Having thus disclosed my invention, I claim:

1. In a frozen food cabinet having a refrigerating system including a refrigerant liquefying unit, a freezer compartment and a compartment insulated therefrom and housing the unit, a defrosting pan mounted in the last mentioned compartment directly above the unit whereby to receive the heat therefrom, and a lid covering both compartments.

2. In a frozen food cabinet having a refrigerating system, a freezer compartment and a defrosting compartment insulated therefrom, a defrosting tray disposed in the last mentioned compartment and adapted to receive heat emanating from the system, and a single lid covering both compartments and defrosting tray.

3. In a frozen food cabinet having a refrigerating system provided with a freezer chamber and a compartment insulated therefrom, a refrigerant liquefying unit including a condenser and compressor in the compartment, a food tray mounted in the compartment above the unit and adapted to receive food to be defrosted, and a lid covering both the freezer chamber and food tray.

4. In a frozen food cabinet having a refrigerating system provided with a refrigerant liquefying unit and including a condenser and compressor, a freezer compartment and a compartment insulated therefrom and housing the unit, a food tray mounted in the last mentioned compartment above the unit whereby the heat from the compressor assists in the defrosting of food placed in the tray and a lid covering the freezer compartment and food tray.

5. In a frozen food cabinet provided with a freezer chamber and a compartment at one side thereof insulated therefrom and provided with a pair of openings, a refrigerant liquifying system for cooling said freezer chamber and including a condenser and compressor unit in the compartment, one of said openings providing a passage for cooling air for said unit, and a removable pan for holding food to be thawed and having imperforate bottom and side walls disposed in said other opening above said unit so as to be heated by convection currents of heated air rising from said unit and flowing toward said first mentioned opening, said pan when disposed in said other opening providing a closure therefor so that the heated air is prevented from entering the pan.

6. In a frozen food cabinet having a refrigerating system, a food storage chamber, a compartment disposed at one side and insulated from the storage chamber and having a pair of openings therein, said system including a refrigerant liquifying unit mounted in the lower portion of said compartment and cooled by the circulation of ambient air through one of said openings, said unit being utilized to cool said chamber, and a removable defrosting pan disposed in the other opening to provide a closure therefor above said unit and adapted to be heated by convection currents of air rising from said unit while flowing toward said first mentioned opening.

7. In a frozen food cabinet having a refrigerating system including a refrigerant liquefying unit, a freezer compartment for receiving the food and cooled by said system, a compartment disposed at one side of and insulated from the freezer compartment and housing therein said refrigerant liquifying unit, said last mentioned compartment having an opening open to the atmosphere and an opening providing access to the unit, and a pan removably positioned in the last mentioned opening and normally providing a closure therefor, said pan being disposed above said unit whereby the underside of the pan is heated by heat emanating from the unit for thawing frozen food placed therein.

8. In a frozen food cabinet having a refrigerating system, a food storage chamber, a compartment disposed at one side and insulated from the storage chamber and having an opening in a side wall and an opening in the top of said compartment, said system including a refrigerant liquifying unit mounted in the lower portion of said compartment and cooled by the circulation of ambient air through the opening in the side wall, said unit being utilized to cool said chamber, a removable defrosting pan disposed in the opening in the top of the compartment to substantially seal the same and adapted to be heated by convection currents of heated air rising from said unit while flowing toward said opening in the side wall, and a cover for the top of the defrosting pan.

LAURIER CARRIÈRE.

REFERENCES CITED

The following references are of record in the file of this patent:

UNITED STATES PATENTS

| Number | Name | Date |
|---|---|---|
| 2,388,746 | Knapp | Nov. 13, 1945 |

FOREIGN PATENTS

| Number | Country | Date |
|---|---|---|
| 477,310 | Great Britain | Mar. 23, 1936 |
| 507,135 | Germany | Sept. 12, 1930 |